(12) United States Patent
Hilgers et al.

(10) Patent No.: US 6,528,615 B2
(45) Date of Patent: Mar. 4, 2003

(54) COPOLYMERS CONTAINING POLYAMIDE BLOCKS AND POLYETHER BLOCKS BASED ON ETHOXYLATED AMINES

(75) Inventors: Hermann Hilgers, Le Tilleul Othon (FR); Reinhard Linemann, Bernay (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/816,675

(22) Filed: Mar. 26, 2001

(65) Prior Publication Data

US 2002/0043333 A1 Apr. 18, 2002

(30) Foreign Application Priority Data

Mar. 24, 2000 (FR) .............................................. 00 03706

(51) Int. Cl.$^7$ .......................... C08G 73/00; C08L 77/00
(52) U.S. Cl. ..................... 528/310; 170/322; 525/420; 525/422; 525/425; 525/432; 525/434; 525/455; 526/935; 156/166; 156/180
(58) Field of Search ................................ 528/170, 310, 528/322; 525/420–422, 425, 432, 435; 526/935; 156/166, 180

(56) References Cited

U.S. PATENT DOCUMENTS

| 4,252,920 A | * | 2/1981 | Deleens et al. ............. 525/430 |
| 4,361,680 A | * | 11/1982 | Borg et al. ................. 525/420 |
| 4,839,441 A | | 6/1989 | Cuzin et al. ................ 528/328 |
| 5,459,230 A | | 10/1995 | de Jong et al. ............. 528/310 |
| 5,489,667 A | * | 2/1996 | Knipf et al. ................ 528/323 |

FOREIGN PATENT DOCUMENTS

| EP | 0 281 461 A1 | 2/1988 |
| WO | WO 99/33659 | 7/1999 |

* cited by examiner

Primary Examiner—P. Hampton-Hightower
(74) Attorney, Agent, or Firm—Millen, White, Zelano & Branigan, P.C.

(57) ABSTRACT

The present invention relates to copolymers containing polyamide blocks and polyether blocks based on ethoxylated primary amines, these copolymers having a melting point of between 80° C. and 135° C. and an MFI (melt flow index) of between 5 and 80 g/10 min (2.16 kg-150° C.).

The invention also relates to adhesives of the HMA (or hot melt adhesive) type consisting of the above copolymers containing polyamide blocks and polyether blocks.

19 Claims, No Drawings

COPOLYMERS CONTAINING POLYAMIDE BLOCKS AND POLYETHER BLOCKS BASED ON ETHOXYLATED AMINES

FIELD OF THE INVENTION

The present invention relates more particularly to copolymers containing polyamide blocks and polyether blocks based on ethoxylated primary amines, these copolymers having a melting point of between 80° C. and 135° C. Copolymers containing polyamide blocks and polyether blocks are generally obtained from the condensation of polyamide blocks containing carboxylic acid ends with polyetherdiols. Ethoxylated primary amines constitute a particular class of polyetherdiols.

These copolymers containing polyamide blocks and polyether blocks are useful as adhesives of the HMA (or hot melt adhesive) type, i.e. they are deposited in molten form onto the surfaces to be bonded and adhesion is then obtained when they return to the solid state by cooling. These adhesives are useful in the textile industry.

PRIOR ART

Patent EP 281 461 describes copolymers containing polyamide blocks and polyether blocks based on ethoxylated primary amines. The polyamide blocks are made of either nylon-6, nylon-6,6, nylon-11 or nylon-12 and the melting points are between 145° C. and 202° C. The description mentions that these copolymers have good water resistance when compared with copolymers containing polyamide blocks and polyether blocks but whose polyether blocks are of polyethylene glycol (PEG). No mention is made of their use as hot melt adhesives; only their mechanical properties are described.

Patent WO 99/33659 describes copolymers containing polyamide blocks and polyether blocks consisting of PEG, these copolymers having a melting point of about 110° C. to 125° C. The polyamide blocks consist of sequences based on diamines, diacids and lactams or α,ω-aminocarboxylic acids. These copolymers can be used as hot-melt adhesives in breathable structures, i.e. structures that are permeable to water vapour but impermeable to liquid water.

U.S. Pat. No. 5,489,667 describes copolymers containing polyamide blocks and polyether blocks consisting of PEG or PTMG (polytetramethylene glycol), these copolymers having a melting point of about 110° C. to 125° C. These copolymers can be used, in unmodified form, as hot-melt adhesives, or can first be extruded into fibres in the form of a nonwoven and this nonwoven can then be placed between two fabrics which it is desired to bond together, the bonding being obtained by heating and pressing. The copolymers described in this prior art have good resistance to washing with detergents in aqueous phase, but withstand hot ironing less well, in particular steam ironing.

THE TECHNICAL PROBLEM

Attempts have been made to use the copolymers described in the second prior art to bond pieces of different textiles constituting an item of clothing, but the resistance to dry-cleaning products and to the usual detergents in aqueous solution is not perfect. The melting point of the copolymers described in the first prior art is too high for them to be used as hot melt adhesives in the textile industry.

Thus, there is a need to develop products with a melting point which is compatible with their use as hot melt adhesives, i.e. products melting approximately between 80° C. and 135° C. These products also need to withstand dry-cleaning products, as well as the usual detergents in aqueous solution and treatment with steam during ironing.

SUMMARY OF THE INVENTION

The present invention relates to copolymers containing polyamide blocks and polyether blocks based on ethoxylated primary amines, these copolymers having a melting point of between 80° C. and 135° C. and an MFI (melt flow index) of between 5 and 80 g/10 min (2.16 kg-150° C.). The melting point is measured by DSC (differential scanning calorimetry) or according to DIN 53736, Volume B (visuelle Bestimmung der Schmelztemperatur von teilkristallinen Kunststoffen) optically using a heating bench and a microscope.

The present invention also relates to adhesives of the HMA type (or hot melt adhesives) consisting of the above polymers containing polyamide blocks and polyether blocks.

The copolymers containing polyamide blocks and polyether blocks result from the copolycondensation of polyamide sequences containing reactive ends with polyether sequences containing reactive ends, such as polyamide sequences containing dicarboxylic chain ends with polyetherdiols, the products obtained in this particular case being polyetheresteramides.

The polyamide sequences containing dicarboxylic chain ends are obtained, for example, from the condensation of α,ω-aminocarboxylic acids, lactams or dicarboxylic acids and diamines in the presence of a chain-limiting dicarboxylic acid.

The number-average molar mass $\overline{M}n$ of the polyamide sequences is between 300 and 15,000 and preferably between 600 and 5000. The mass $\overline{M}n$ of the polyether sequences is between 100 and 6000 and preferably between 200 and 3000.

The copolymers containing polyamide blocks and polyether blocks can also comprise randomly distributed units. These copolymers can be prepared by simultaneously reacting the polyether and the polyamide block precursors.

For example, a polyetherdiol, a lactam (or an α,ω-amino acid) and a chain-limiting diacid can be reacted together in the presence of a small amount of water. A polymer essentially containing polyether blocks, polyamide blocks of very variable length, but also the various reagents which have reacted randomly and which are randomly distributed along the polymer chain, is obtained.

According to a first form of the invention, the polyamide sequences result, for example, from the condensation of one or more α,ω-aminocarboxylic acids and/or from one or more lactams containing from 6 to 12 carbon atoms in the presence of a dicarboxylic acid containing from 4 to 12 carbon atoms, and have a low mass, i.e. $\overline{M}n$ from 400 to 1000, advantageously from 400 to 800. Examples of α,ω-aminocarboxylic acids which may be mentioned are aminoundecanoic acid and aminododecanoic acid. Examples of dicarboxylic acids which may be mentioned are adipic acid, sebacic acid, azelaic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids having a dimer content of at least 98% and being preferably hydrogenated) and dodecanedioic acid $HOOC-(CH_2)_{10}-COOH$.

Examples of lactams which may be mentioned are caprolactam and lauryllactam. Caprolactam will be avoided, unless the polyamide is purified of the monomeric caprolactam remaining dissolved therein.

Polyamide sequences obtained by condensing lauryllactam in the presence of adipic acid or dodecanedioic acid and having a mass $\overline{M}n$ of 750 have a melting point of 127–130° C.

According to a second form of the invention, the polyamide sequences result from the condensation of at least one α,ω-aminocarboxylic acid (or a lactam), at least one diamine and at least one dicarboxylic acid. The α,ω-aminocarboxylic acid, the lactam and the dicarboxylic acid can be chosen from those mentioned above.

The diamine can be an aliphatic diamine containing from 6 to 12 carbon atoms, and can be an arylic and/or saturated cyclic diamine.

Examples which may be mentioned are hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, polyoldiamines, isophoronediamine (IPD), methylpenta-methylenediamine (MPDM), bis(aminocyclohexyl)methane (BACM), and bis(3-methyl-4-aminocyclohexyl)methane (BMACM).

The various constituents of the polyamide sequence and their proportion are chosen so as to obtain a melting point of between 80° C. and 135° C. and advantageously between 100° C. and 130° C..

Copolyamides with a low melting point are described in U.S. Pat. No. 4,483,975, DE 3 730 504 and U.S. Pat. No. 5,459,230; the same proportions of constituents for the polyamide blocks are used in the second form of the invention. The polyamide blocks of the second form can also be the polyamide blocks of the copolymers described in U.S. Pat. No. 5,489,667.

Examples of ethoxylated primary amines which may be mentioned are the products of formula I:

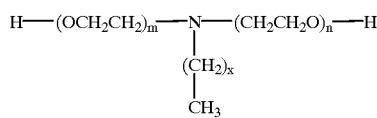

I in which m and n are integers in the range of 1–20 and x is an integer in the range of 8–18. These products are commercially available under the trade name NORAMOX® from the company CECA and under the trade name GENAMIN® from the company CLARIANT.

The polyether blocks can represent 5 to 85% by weight of the copolymers of the invention. It would not constitute a departure from the context of the invention if the copolymers contained, in addition to the ethoxylated primary amines, other blocks such as PEG blocks, i.e. blocks consisting of ethylene oxide units, PPG blocks, i.e. blocks consisting of propylene oxide units, PTMG blocks, i.e. blocks consisting of tetramethylene glycol units, also known as polytetrahydrofuran, and finally blocks obtained by oxyethylation of bisphenols such as, for example, bisphenol A, as described in patent EP 613 919. The amount of polyether blocks is preferably from 10% to 50% by weight of (B).

The copolymers of the invention can be prepared by any means for attaching the polyamide blocks and the polyether blocks. In practice, basically two processes are used, one being a 2-step process and the other a one-step process.

The 2-step process consists firstly in preparing the polyamide blocks containing carboxylic ends by condensation of the polyamide precursors in the presence of a chain-limiting dicarboxylic acid, and then, in a second step, in adding the polyether and a catalyst. If the polyamide precursors are only lactams or α,ω-aminocarboxylic acids, a dicarboxylic acid is added. If the precursors already comprise a dicarboxylic acid, this acid is used in excess relative to the stoichiometry of the diamines. The reaction usually takes place between 180 and 300° C., preferably 200 to 260° C., and the pressure in the reactor is established at between 5 and 30 bar, and is maintained for about 2 hours. The pressure is reduced slowly by opening the reactor to the atmosphere and the excess water is then distilled off, for example over one or two hours.

Once the polyamide containing carboxylic acid ends has been prepared, the polyether and a catalyst are then added. The polyether can be added in one or more portions, as can the catalyst. According to one advantageous form, the polyether is added first, and the reaction of the OH ends of the polyether and of the COOH ends of the polyamide commences, with formation of ester bonds and removal of water; as much water as possible is removed from the reaction medium by distillation, and the catalyst is then introduced to complete the linking of the polyamide blocks and polyether blocks. This second step is carried out with stirring, preferably under a vacuum of at least 5 mm Hg (650 Pa) at a temperature such that the reagents and the copolymers obtained are in molten form. By way of example, this temperature can be between 100° C. and 400° C. and usually between 200° C. and 300° C. The reaction is monitored by measuring the torsional couple exerted by the molten polymer on the stirrer or by measuring the electrical power consumed by the stirrer. The end of the reaction is determined by the value of the couple or of the target power. The catalyst is defined as being any product which facilitates the linking of the polyamide blocks and polyether blocks by esterification. The catalyst is advantageously a derivative of a metal (M) chosen from the group formed by titanium, zirconium and hafnium.

Examples of derivatives which may be mentioned are tetraalkoxides corresponding to the general formula M(OR)$_4$, in which M represents titanium, zirconium or hafnium and the radicals R, which may be identical or different, denote linear or branched alkyl radicals containing from 1 to 24 carbon atoms.

The $C_1$ to $C_{24}$ alkyl radicals, from which the radicals R in the tetraalkoxides used as catalysts in the process according to the invention are chosen, are, for example, alkyl radicals such as methyl, ethyl, propyl, isopropyl, butyl, ethylhexyl, decyl, dodecyl or hexadodecyl. The preferred catalysts are the tetraalkoxides for which the radicals R, which may be identical or different, are $C_1$ to $C_8$ alkyl radicals. Examples of such catalysts are, in particular, $Z_r(OC_2H_5)_4$, $Z_r(O\text{-}isoC_3H_7)_4$, $Z_r(OC_4H_9)_4$, $Z_r(OC_5H_{11})_4$, $Z_r(OC_6H_{13})_4$, $H_f(OC_2H_5)_4$, $H_f(OC_4H_9)_4$ and $H_f(O\text{-}isoC_3H_7)_4$.

The catalyst used in this process according to the invention can consist solely of one or more of the tetraalkoxides of formula M(OR)$_4$ defined above. It can also be formed by the combination of one or more of these tetraalkoxides with one or more alkali metal alkoxides or alkaline-earth metal alkoxides of formula $(R_1O)_pY$ in which $R_1$ denotes a hydrocarbon-based residue, advantageously a $C_1$ to $C_{24}$ and preferably $C_1$ to $C_8$ alkyl residue, Y represents an alkali metal or alkaline-earth metal and p is the valency of Y. The amounts of alkali metal or alkaline-earth metal alkoxide and of zirconium or hafnium tetraalkoxides which are combined to constitute the mixed catalyst can vary within a wide range. However, it is preferred to use amounts of alkoxide and of tetraalkoxides such that the molar proportion of alkoxide is substantially equal to the molar proportion of tetraalkoxide.

The weight proportion of catalyst, i.e. of the tetraalkoxide (s) when the catalyst contains no alkali metal alkoxide or alkaline-earth metal alkoxide, or alternatively of all of the tetraalkoxide(s) and of the alkali metal or alkaline-earth metal alkoxide(s) when the catalyst is formed by a combination of these two types of compounds, advantageously ranges from 0.01% to 5% relative to the weight of the mixture of the dicarboxylic polyamide with the polyoxyalkylene glycol and is preferably between 0.05% and 2% relative to this weight.

Examples of other derivatives which may also be mentioned are salts of the metal (M), in particular salts of (M) and of an organic acid, and complex salts between the oxide of (M) and/or the hydroxide of (M) and an organic acid. The organic acid may advantageously be formic acid, acetic acid, propionic acid, butyric acid, valeric acid, caproic acid, caprylic acid, lauric acid, myristic acid, palmitic acid, stearic acid, oleic acid, linoleic acid, linolenic acid, cyclohexanecarboxylic acid, phenylacetic acid, benzoic acid, salicylic acid, oxalic acid, malonic acid, succinic acid, glutaric acid, adipic acid, maleic acid, fumaric acid, phthalic acid and crotonic acid. Acetic acid and propionic acid are particularly preferred. M is advantageously zirconium. These salts can be referred to as zirconyl salts. Without being bound by this explanation, the Applicant believes that these salts of zirconium and of an organic acid or the complex salts mentioned above release $ZrO^{++}$ during the process. The product sold under the name zirconyl acetate is used. The amount to be used is the same as for the derivatives $M(OR)_4$.

This process and these catalysts are described in U.S. Pat. Nos. 4,332,920, 4,230,838, 4,331,786, 4,252,920, JP 07145368A, JP 06287547A and EP 613919.

As regards the one-step process, all the reagents used in the two-step process, i.e. the polyamide precursors, the chain-limiting dicarboxylic acid, the polyether and the catalyst, are mixed together. These are the same reagents and the same catalyst as in the two-step process described above. If the polyamide precursors are only lactams, it is advantageous to add a small amount of water.

The copolymer essentially contains the same polyether blocks and the same polyamide blocks, but also a small portion of the other reagents which have reacted randomly and which are randomly distributed along the polymer chain.

The reactor is closed and heated with stirring as in the first step of the two-step process described above. The pressure is established at between 5 and 30 bar. When it no longer changes, the reactor is placed under reduced pressure while maintaining vigorous stirring of the molten reagents. The reaction is continued as above for the two-step process.

The catalyst used in the one-step process is preferably a salt of the metal (M) and of an organic acid or a complex salt between the oxide of (M) and/or the hydroxide of (M) and an organic acid.

The MFI value for the copolymers of the invention is adjusted by the amount of chain limiter or the excess outside the stoichiometry of a diacid used for the synthesis; the larger this amount, the smaller the MFI value. A person skilled in the art can easily adjust this amount from observations made on the stirring couple of the synthesis reactor.

Examples of copolymers which may be mentioned are the following products:

6/6-6/6-9/6-12/MPMD-9/FAOET-12 in which
6 is caprolactam,
6-6 is hexamethyleneadipamide,
6-9 is hexamethyleneazelamide,
6-12 is hexamethylenedodecanamide,
MPMD-9 is methylpentamethyleneazelamide,
FAOET is the ethoxylated primary amine and 12 is the chain limiter (C12 diacid) for the polyamide block; the proportion of limiter can be from 5 to 20 mol per 100 mol of the polyether limiter as a whole.

The proportions are, respectively, by weight:
18 to 22/12 to 15/6 to 8/12 to 15/18 to 22/28 to 32, the total being 100.

6/6-12/11/FAOET-12 in which
6 is caprolactam,
6-12 is hexamethylenedodecanamide,
11 is the C11 amino acid,
FAOET is the ethoxylated primary amine and 12 is the chain limiter (C12 diacid) for the polyamide block; the proportion of limiter can be from 5 to 20 mol per 100 mol of the polyether limiter as a whole.

The proportions are, respectively, by weight:
20 to 25/22 to 27/20 to 25/28 to 32, the total being 100.

6/11/6-6/FAOET-6 in which
6 is caprolactam,
11 is the C11 amino acid,
6-6 is hexamethyleneadipamide,
FAOET is the ethoxylated primary amine and 6 is the chain limiter (adipic acid) for the polyamide block; the proportion of limiter can be from 5 to 20 mol per 100 mol of the polyether limiter as a whole.

The proportions are, respectively, by weight:
28 to 35/32 to 45/15 to 18/5 to 25, the total being 100.

Other products are cited in the examples.

The compositions according to the invention can also contain at least one additive chosen from:

fillers (minerals, flame retardants, etc.);

fibres;

mineral salts and/or organic salts and/or polyelectrolyte salts;

dyes;

pigments;

optical brighteners;

antioxidants;

UV stabilizers.

EXAMPLES

Comparative Example

Preparation of the copolymer 6/11/6-12/PEG-12 in a proportion by mass of 21/24.5/24.5/30.

The following monomers are introduced into an autoclave equipped with a stirrer: 2450 g of caprolactam, 2450 g of aminoundecanoic acid, 704.2 g of hexamethylenediamine and 2188.4 g of dodecanedioic acid.

The mixture thus formed is placed under an inert atmosphere and heated until the temperature reaches 260° C., while maintaining vigorous stirring once the reagents melt. 260° C. and 14 bar of pressure are maintained for 1 hour (precondensation). The pressure is then reduced (over ½ h) from 14 bar to atmospheric pressure, while maintaining the temperature at 260° C. 2187.4 g of dihydroxylated polyoxyethylene (PEG Mn=600) and 40 g of di-n-butyl zirconate are then introduced.

The product obtained is placed under a reduced pressure of about 30 mbar. The reaction is continued for a period of 1 h. The product is extruded in a bath of water and granulated.

The product in the form of granules was ground cryogenically in a conventional cold mill. The powder thus obtained was separated into several fractions of different particle sizes using conventional screens. The fraction 80–200 μm was tested. The results are described in Table 1.

Example 1

Preparation of the copolymer 6/11/6-12/PEG-12/NORAMOXS2-12 in a proportion by mass of 21/24.5/24.5/15/15. NORAMOX®S2 denotes the product if formula I above, in which m+n=2; it is also known as N,N-bis(2-hydroxyethyl)tallowamine and is sold by the company CECA.

The following monomers are introduced into an autoclave equipped with a stirrer: 2520 g of caprolactam, 2940 g of aminoundecanoic acid, 985.9 g of hexamethylenediamine and 2441.7 g of dodecanedioic acid.

The mixture thus formed is placed under an inert atmosphere and heated until the temperature reaches 250° C., while maintaining vigorous stirring once the reagents melt. 250° C. and 20 bar of pressure are maintained for 1 hour (precondensation). The pressure is then reduced (over 1 h) from 20 bar to atmospheric pressure, while maintaining the temperature at 250° C. 1312.4 g of dihydroxylated polyoxyethylene (PEG Mn=600), 1085.8 g of NORAMOX S2 and 48 g of di-n-butyl zirconate are then introduced.

The mixture obtained is placed under a reduced pressure of about 30 mbar. The reaction is continued for a period of 1 h. The product is extruded in a bath of water and granulated.

As in the Comparative Example, the product in the form of granules was ground cryogenically in a conventional cold mill. The powder thus obtained was separated into several fractions of different particle sizes using conventional screens. The fraction 80–200 μm was tested. The results are described in Table 1.

Example 2

Preparation of the copolymer 6/11/6-12/PEG-12/NORAMOXS2-12 in a proportion by mass of 21/24.5/24.5/7.5/22.5.

The following monomers are introduced into an autoclave equipped with a stirrer: 2520 g of caprolactam, 2940 g of aminoundecanoic acid, 985.9 g of hexamethylenediamine and 2441.7 g of dodecanedioic acid.

The mixture thus formed is placed under an inert atmosphere and heated until the temperature reaches 250° C., while maintaining vigorous stirring once the reagents melt. 250° C. and 20 bar of pressure are maintained for 1 hour (precondensation). The pressure is then reduced (over 1 h) from 20 bar to atmospheric pressure, while maintaining the temperature at 250° C. Now, 656.2 g of dihydroxylated polyoxyethylene (PEG Mn=600), 1628.7 g of NORAMOX S2 and 48 g of di-n-butyl zirconate are introduced.

The mixture obtained is placed under a reduced pressure of about 30 mbar. The reaction is continued for a period of 1 h. The product is extruded in a bath of water and granulated.

As in the Comparative Example, the product in the form of granules was ground cryogenically in a conventional cold mill. The powder thus obtained was separated into several fractions of different particle sizes using conventional screens. The fraction 80–200 μm was tested. The results are described in Table 1.

The copolymers according to the examples above were applied by printing onto a cotton nonwoven using a powder point printing device according to the usual techniques of the textile coating industry. About 15 g of copolymer per m² of cotton nonwoven are deposited using a 17-mesh printing screen.

The nonwovens thus coated were bonded to a fabric composed of 45% wool and 55% polyester, the bonding being carried out by pressing between hot plates for 15 seconds and under a pressing force corresponding to 350 mbar. The temperature of the press plates is adjusted to different values between 120° C. and 160° C. This produces a series of laminates (cotton nonwoven coated with copolymer bonded by pressing onto the wool/polyester fabric) which are produced at different pressing temperatures, and they are then cut into samples 5 cm wide. The tear strength of these samples is measured in N/5 cm according to DIN standard 54 310. The measurements are carried out on 3 series of laminates: those which have just been manufactured and which do not undergo any treatment, those which have undergone 3 washes at 40° C., and finally those which have undergone 3 dry-cleaning washes. The resistance of the laminates to water vapour was also measured, by applying the vapour from a steam press or a steam iron to them for 10 min and then measuring the tear strength in g/5 cm using a tensile testing machine. The relative viscosity in solution is measured at 0.5% on m-cresol at 20° C. using an Ostwald viscometer.

TABLE 1

| Product | Comparative Example | Example 1 according to the invention | Example 2 according to the invention |
|---|---|---|---|
| Composition (% by mass) | 6:21<br>11:24.5<br>6.12:24.5<br>PEG.12:30 | 6:21<br>11:24.5<br>6.12:24.5<br>PEG.12:15<br>NOR.12:15 | 6:21<br>11:24.5<br>6.12:24.5<br>PEG.12:7.5<br>NOR.12:22.5 |
| Tf/° C. | 116–123 | 115–120 | 110–120 |
| Relative viscosity in solution | 1.63 | 1.49 | 1.37 |
| MFI$_{150° C.}$/g/10 min | 15.0 | 7.2 | 15.8 |
| Pressing temperature | Tear strength of the untreated laminate | | |
| 120° C. | 6.0 | 6.0 | 8.0 |
| 130° C. | 7.5 | 7.5 | 11.0 |
| 140° C. | 9.0 | 8.5 | 12.5 |
| 150° C. | 10.5 | 9.5 | 12.5 |
| 160° C. | 12.0 | 11.0 | 15.0 |
| Pressing temperature | Tear strength of the laminate after 3 washes at 40° C. | | |
| 120° C. | 3.5 | 4.5 | 5.0 |
| 130° C. | 4.0 | 5.0 | 7.5 |
| 140° C. | 4.0 | 6.0 | 9.0 |
| 150° C. | 7.0 | 6.0 | 10.0 |
| 160° C. | 8.0 | 9.0 | 11.0 |
| Pressing temperature | Tear strength of the laminate after 3 dry-cleaning washes | | |
| 120° C. | 4.0 | 4.0 | 6.0 |
| 130° C. | 4.5 | 6.0 | 7.5 |
| 140° C. | 6.0 | 7.5 | 9.0 |
| 150° C. | 7.0 | 7.0 | 10.0 |
| 160° C. | 8.0 | 9.0 | 13.5 |
| Resistance to hot steam in g/5 cm | 50–350 | 400–600 | 300–550 |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 00/03.796, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A hot melt adhesive comprising copolymers containing (A) polyamide blocks and (B) polyether blocks produced from reactants comprising an ethoxylated primary amine, said polyamide blocks (A) having a number average molecular mass between 300 and 15,000 and said polyether block (B) having a number average molecular mass of between 100 and 6000, (A) and (B) being present in a ratio in the copolymers to provide a melting point of between 80° C. and 135° C. and having been prepared with a sufficient amount of a dicarboxylic acid to yield an MFI (melt flow index) of between 5 and 80 g/10 min (2.16 kg-150° C.).

2. A holt melt adhesive according to claim 1, in which the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms, and have a number average molecular weight of 400 to 800.

3. A hot melt adhesive according to claim 1, in which the polyamide blocks result from the condensation of at least one α,ω-aminocarboxylic acid or a lactam, at least one diamine and at least one dicarboxylic acid.

4. A hot melt adhesive according to claim 1, wherein (A) and (B) are present in a molar ratio to provide a melting point of between 100° C. and 130° C.

5. A hot melt adhesive according to claim 1, wherein in the ethoxylated primary amine is of the formula:

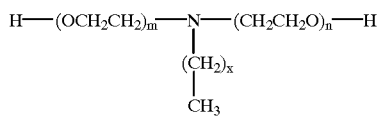

in which m and n are between 1 and 20 inclusive and x is between 8 and 18 inclusive.

6. A holt melt adhesive according to claim 1, in which the polyether blocks represent 5 to 85% by weight of the copolymer.

7. A hot melt adhesive according to claim 1, in which the polyether blocks represent 10 to 50% by weight of the copolymer.

8. A hot melt adhesive according to claim 2, wherein in the ethoxylated primary amine is of the formula:

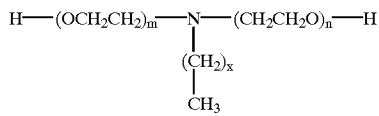

in which m and n are between 1 and 20 inclusive and x is between 8 and 18 inclusive.

9. A hot melt adhesive according to claim 8, in which the polyether blocks represent 5 to 85% by weight of the copolymers.

10. A hot melt adhesive according to claim 8, in which the polyether blocks represent 10 to 50% by weight of the copolymers.

11. A holt melt adhesive comprising a copolymer having a melting point between 80° C. and 135° C., said copolymer having been prepared with a sufficient amount of a dicarboxylic acid to yield an MFI (melt flow index) of between 5 and 80 g/10 min (2.16 kg-150° C.), said copolymer being selected from the group consisting of (I) a copolymer of the formula:
6/6-6/6-9/6-12/MPMD-9/FAOET-12 in which
(a) 6 is caprolactam,
(b) 6-6 is hexamethyleneadipamide,
(c) 6-9 is hexamethyleneazelamide,
(d) 6-12 is hexamethylenedodecanamide,
(e) MPMD-9 is methylpentamethyleneazelamide,
(f) FAOET is an ethoxylated primary amine and 12 is a chain limiter (C12 diacid) for resultant polyamide block; the proportion of chain limiter being from 5 to 20 mol per 100 mol of the FAOET-12 as a whole, the proportions being, respectively, by weight:
(a):18 to 22/(b):12 to 15/(c):6 to 8/(d):12 to 15/(e):18 to 22/(f):28 to 32, the total being 100;

(II) a copolymer of the formula:
6/6-12 /11 /FAOET-12 in which
(a) 6 is caprolactam,
(b) 6-12 is hexamethylenedodecanamide,
(c) 11 is the C11 amino acid,
(d) FAOET is ethoxylated primary amine and 12 is a chain limiter (C12 diacid)
for the polyamide block; the proportion of limiter being from 5 to 20 mol per 100 mol of the FACET-12 as a whole, the proportions being, respectively, by weight:
(a):20 to 25/(b):22 to 27/(c):20 to 25/(d):28 to 32, the total being 100;

(III) a copolymer of the formula:
6/11/6-6 /FAOET-6 in which
(a) 6 is caprolactam,
(b) 11 is a C11 amino acid,
(c) 6-6 is hexamethyleneadipamide,
(d) FAOET is the ethoxylated primary amine and 6 is the chain limiter (adipic acid) for the polyamide block; the proportion of limiter being from 5 to 20 mol per 100 mol of the polyether limiter as a whole, the proportions being, respectively, by weight:
(a):28 to 35/(b):32 to 45/(c):15 to 18/(d):5 to 25, the total being 100; and (IV) a copolymer of the formula:
6/11/6-12/PEG-12/NORAMOXS2-12 in which
(a) 6 is caprolactam
(b) 11 is a C11 amino acid,
(c) 6-12 is hexamethylenedodecanamide,
(d) PEG-12 is dihydroxylated polyoxyethylene (PEG Mn=600)
(e) NORAMOX®S2 denotes N.N-bis(2-hydroxyethyl)tallowamine, the proportions being, respectively by weight:
(a):21/(b):24.5/(c):24.5/(d): 15/(e): 15.

12. A hot melt adhesive according to claim 1, wherein (A) has a number average molecular mass of between 600 and 5000.

13. A holt melt adhesive according to claim 1, wherein (B) has a number average molecular mass of between 200 and 300.

14. A holt melt adhesive according to claim 12, wherein (B) has a number average molecular mass of between 200 and 300.

15. A holt melt adhesive according to claim 2, wherein (B) has a number average molecular mass of between 200 and 300.

16. In a method of bonding textiles comprising applying an adhesive to a first textile fabric and bonding a second textile fabric to said adhesive, the improvement wherein said adhesive is a hot melt adhesive according to claim 1.

17. Bonded textile fabrics as produced by the method of claim 16.

18. A hot melt adhesive according to claim 5, in which the polyether blocks represent 5 to 85% by weight of the copolymers.

19. A hot melt adhesive according to claim 8, in which the polyether blocks represent 10 to 50% by weight of the copolymers.

* * * * *

UNITED STATES PATENT AND TRADEMARK OFFICE
CERTIFICATE OF CORRECTION

PATENT NO.    : 6,528,615 B2
DATED         : March 4, 2003
INVENTOR(S)   : Hermann Hilgers et al.

It is certified that error appears in the above-identified patent and that said Letters Patent is hereby corrected as shown below:

<u>Title page,</u>
Item [30], Foreign Application Priority Data, reads "00 03706" should read -- 00 03796 --

<u>Column 10,</u>
Line 25, reads "FACET-12" should read -- FAOET-12 --

Signed and Sealed this

Twenty-third Day of March, 2004

JON W. DUDAS
*Acting Director of the United States Patent and Trademark Office*